Sept. 12, 1967
D. COSTES
3,341,423
HANDLING DEVICE FOR NUCLEAR REACTOR REFUELLING FACILITY
Filed Aug. 25, 1965
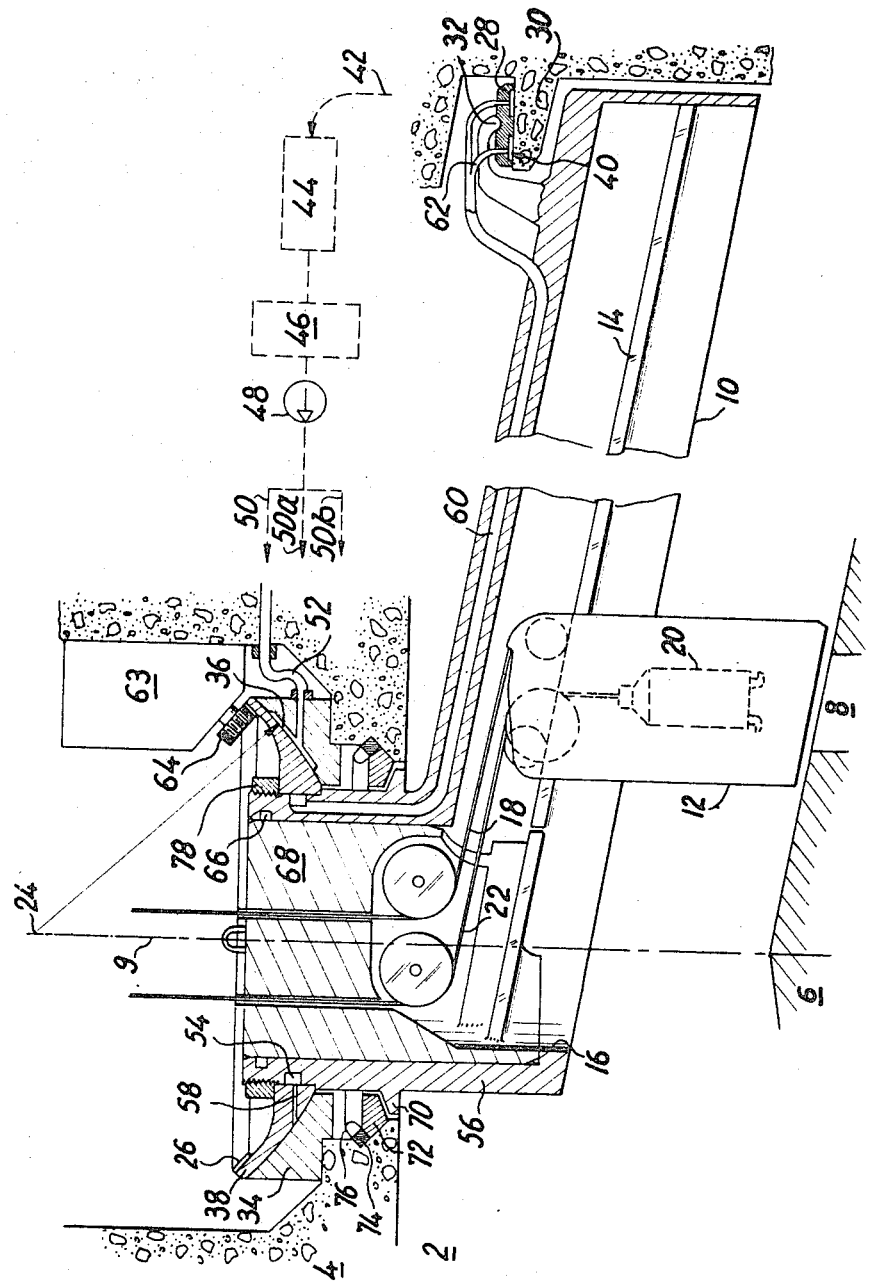

United States Patent Office 3,341,423
Patented Sept. 12, 1967

3,341,423
HANDLING DEVICE FOR NUCLEAR REACTOR REFUELLING FACILITY
Didier Costes, Paris, France, assignor to Commissariat à l'Energie Atomique
Filed Aug. 25, 1965, Ser. No. 482,502
Claims priority, application France, Sept. 1, 1964, 986,803
5 Claims. (Cl. 176—30)

ABSTRACT OF THE DISCLOSURE

A refueling device for a nuclear reactor having a radial arm rotatable in a chamber formed in the reactor vessel and a machine mounted for movement along the arm. The arm is supported by gas cushions at a central pivot and on a circumferential track.

---

The present invention is concerned with a handling device for the refuelling facility of a nuclear reactor with vertical fuel channels of the type which is cooled by a heat-transporting gas under pressure, said device being designed for the purpose of inserting fresh fuel elements within the channels of the reactor core and withdrawing spent fuel elements therefrom.

The invention is applicable especially to the refuelling during operation of reactors of the type comprising a "garret." The term "garret" is employed to designate a chamber which is formed within the pressure containment vessel of a nuclear reactor and which may in certain cases be separated from the reactor core chamber by a wall for attenuating radiation pierced by pluggable openings for providing access to the fuel channels. The garret referred to can be designed to accommodate a number of different equipment units and especially the fuel element handling device, namely that part of the refuelling facility which serves to introduce fresh fuel elements within the reactor channels and to withdraw said elements therefrom when these latter are spent.

In the garret-type reactors which have been contemplated in the prior art, an auxiliary circuit which is also referred to as a conditioning circuit draws-off gas from the main coolant gas circuit and restores said coolant gas to the garret through openings provided in any suitable locations, after cooling, filtration and slight overpressurizing. Said gas is heated to a moderate degree within the garret, then passes out towards the reactor core through the communication openings and in particular through those openings of the partition plate which may be unplugged at that time. Radioactive contamination of the garret is thus prevented and the temperature of the garret can be maintained at a sufficiently low value to ensure that the mechanical components of the handling device can be of conventional type and especially to ensure that lubricants of more or less standard types can be employed for the bearings, rubbing surfaces and so forth, steps being also taken to ensure that such lubricants are not liable to contaminate chemically the main coolant gas circuit.

However, the arrangement referred to above allows certain difficulties to remain. In particular, the maintenance of mechanical components which have to remain continuously within the garret can be carried out only after shut-down of the reactor and depressurization to atmospheric, thus entailing a limitation of performance.

The present invention is directed to the design concept of a handling device which meets practical requirements more effectively than handling devices of the prior art; in the case of a garret-type reactor, the invention virtually eliminates all maintenance work on mechanisms which are permanently located within the garret, reduces rubbing friction and dispenses with the need to maintain the garret at a low temperature and low radiation levels, provided that all the garret mechanisms other than those of the refuelling machine are capable of working under the same conditions.

With this object in view, this invention proposes a handling device for the refuelling facility of a nuclear reactor which is cooled by circulation of heat-transporting gas through vertical channels, said device further comprising an arm rotatably mounted about an axis parallel to said channels on a central gas-cushion cup-bearing and on a terminal gas-cushion member slidably mounted on a circular ring, a machine which is movable along said arm, and means for driving said arm in rotation and for driving said machine in translation along said arm, said terminal member being supplied with gas through a pipe carried by the arm from a source which is common with that of said central cup-bearing.

In the case of a garret-type reactor, it is apparent that those sliding members which cannot be withdrawn from the garret are of the gas cushion type, therefore of simple constructional design and highly reliable in operation.

The auxiliary circuit will be designated hereinafter as a lubrication circuit. The sliding gas-cushion members can be of any conventional type. The connection between the lubrication circuit and the sliding members with a view to conveying the coolant gas can also be ensured by conventional means such as hoses, bellows, and toroidal-groove bearings on parts designed for relative rotational motion.

The lubrication circuit can be completely independent of the conditioning circuit (particularly if this latter is not provided). In that case, said circuit comprises devices for drawing-off gas from the main reactor circuit, for cooling, filtration and over-pressurization.

The lubrication circuit can also be supplied with gas which is cooled and filtered by the conditioning circuit. Since the pressure which is necessary for the operation of the sliding members is usually higher than that which is available within the conditioning circuit, provision must be made within the lubrication circuit for a special booster compressor which is started up only for the operation of the refueling machine.

In the case of a garret-type reactor, the lubrication booster compressor has a relatively low power consumption when the reactor is at pressure; it is only when the reactor is at atmospheric pressure that it requires high power. In this case, it is possible to make use of a volumetric booster compressor provided with an accumulation chamber in accordance with a known arrangement which permits of non-continuous operation as required of the fuel element handling device.

Generally speaking, the lubrication circuit is supplied only when it is desired to move members which are supported by gas layer; during inoperative periods, the different shoes are supported with friction by their bearing surfaces and are therefore braked, which can prove an advantage for the operation of the refuelling machine.

The invention applies in particular to and will be more especially described in the case of a device for performing handling operations within a garret, wherein said device comprises a radial supporting arm which describes a cone (or alternatively a flat circle) about the general vertical axis of the reactor, said radial arm being pierced by an opening which is located centrally of the reactor and which is intended to permit the insertion and withdrawal of the fuelling machine proper or at least a portion of said machine. The radial arm is in that case supported by a vertical thrust-bearing centrally of the reactor and by one or two bearing-shoes on an outer support ring which is secured to the pressure vessel walls, said thrust-bearing and said shoes being supplied with gas under pressure.

The invention also consists of other arrangements which can advantageously be employed in conjunction with the preceding but which can also be employed independently thereof.

A better understanding of the invention will be gained from a perusal of the following description of one form of embodiment which is given by way of example and not in any sense by way of limitation. Reference is made in the description to the single accompanying figure which shows very diagrammatically the top portion of the garret of a reactor which is equipped with a handling device according to the invention, as represented in cross-section on a plane which passes through the axis.

The handling device as described and as illustrated in the figure forms part of a facility for recharging fuel elements in the channels of a nuclear reactor of the solid moderator type which is cooled by a gas (usually carbon dioxide gas) and provided with a garret. The figure shows the garret 2 of the reactor as delimited by a pressure vessel 4 having a vertical axis 9, a top chamber 5 and a bottom grid plate 6 traversed by pluggable guide tubes such as the tube 8 which provide access to the vertical channels formed in the reactor core.

The handling device of the refuelling facility which is alone illustrated in the figure comprises a radial arm 10 which is orientable about the vertical axis and its rotary drive mechanism, and a machine 12 which is displaceable along said arm and fitted with a grappling unit.

The radial arm 10 has a transverse cross-section in the shape of an inverted U and is provided at its mid-height with two internal flanges such as the flange 14 forming the tracks on which the machine 12 is carried; the top portion of the radial arm is pierced by an opening 16 which is centered on the axis of rotation 9 and which is intended to permit the machine 12 to pass through.

The arm 10 has a downward slope towards the exterior which is sufficient to initiate the downward motion of the grappler carriage under the action of its own weight as and when the control device is released. The top face of the grid plate 6 advantageously has the shape of a cone which is homothetic with the cone swept by the flanges 14 and which is located at a distance from these latter which corresponds to the overall vertical dimensions of the machine 12.

The machine 12 consists basically of a simple bell-housing fitted with runner-wheels which are adapted to roll on the flanges 14; the displacement of the machine 12 towards the axis (centripetal motion) is carried out as a result of traction applied to a cable 18 and the displacement of said machine from the axis towards the exterior (centrifugal motion) is effected under the action of gravity simply by releasing the cable 48.

The grappling unit which is carried by the machine consists of a grab 20 of any suitable type which is fitted with engagement hooks. The upward movement of said grab is carried out under the action of a cable 22 which is operated by means of a winch placed outside the garret.

All of the arrangements described thus far are similar to those described in French Patent No. 1,400,440 to which reference can be made, and especially to the arrangements which are illustrated in FIGS. 7 to 10 of said patent.

In accordance with the present invention, the radial arm 10 is supported by sliding members on a gas cushion. In the form of embodiment herein contemplated, the radial arm 10 is supported at the center by a cup-bearing 24 with orientation control by a ring gear 26 and at the periphery by two bearing-shoes 28 which are symmetrical with respect to the plane of the figure. Each bearing-shoe is adapted to slide over an annular corbel 30 and supports the radial arm by means of a limited-movement knuckle 32. The radial arm is thus maintained in isostatic manner and no additional stress arises from expansional movements.

The central cup-bearing 24 consists of a spherical trough or cup 34 which is provided with at least three annular chambers such as 36 which are each separately supplied with gas and distributed about the axis 9 and by a spherical flange 38 which is adapted to cooperate with the cup 34. This arrangement ensures the equilibrium of the structure which is thus supported without any solid contact between the cup 34 and the spherical flange 38.

Similarly, each bearing-shoe 28, which is adapted to slide on the substantially horizontal top face of the annular corbel 30, is provided on its bearing face with at least three chambers such as the chamber 40 which are separately supplied with gas, thereby ensuring the equilibrium of said bearing-shoe without any solid contact. The support knuckle 32 can be of any known type with rolling surfaces which do not require lubrication.

The lubrication circuit will now be described from the upstream end to the downstream end.

The devices which effect the gas supply are of known types and are shown diagrammatically in broken lines in the figure. A pipe 42 for drawing-off gas from the main reactor circuit (for example, downstream of the blower so as to draw-off gas at a relatively high pressure and low temperature) terminates in a cooler 44 in which the gas temperature is reduced to the value chosen for the re-fuelling machine, for example 100° C. The gas then flows into a filter 46 and into a booster compressor 48 in which the pressure is increased to the value $P+p$, wherein $P$ is the pressure within the garret and $p$ is the overpressure which is necessary for the operation of the sliding members. The gas is then directed into three pipes 50, 50a and 50b at approximately equal flow rates. This equality can be obtained by interposing identical diaphragms in the three pipes and by permitting a fairly substantial pressure drop. Instead of diaphragms, it would be possible to make use of known systems having a lower power consumption, such as servo-controlled valves or three volumetric machines with coupled shafts.

The figure shows only the path of the pipe 50, the paths of the pipes 50a and 50b being identical with angular displacements of 120° about the axis 9. The pipe 50 terminates in the annular chamber 36 with interposition of a removable section 52 which permits of disassembly of the bearing cup 34.

The gas which supports the annular flange 38 escapes partly towards the atmosphere on the chamber 5 through the small circle and large circle of the spherical gas-cushion ring and partly towards an annular groove 54 which is machined around the sleeve 56 which serves to join the annular flange 38 to the radial arm 10. The junction between the gas cushion and the groove 54 is carried out by means of at least six radial ducts such as 58 which produce a certain pressure drop in such a manner as to prevent the equilibrium of the support provided by the gas, or gas cushion, from being impaired as a result of direct communication between the annular chambers 36.

The gas which is collected by the groove 54 is conveyed by a pipe 60 to the peripheral extremity of the radial arm; small pipes 52, each supplying one of the chambers such as 40 of the end bearing-shoes, are connected to said pipe 60. The pressure drops within said small pipes make it possible to ensure stability of the gas cushion.

The orientation of the radial arm is controlled by a removable motor 63 which is placed within the chamber 5 and drives the ring gear 26 by means of a pinion 64. Taking into account the possibility of slight movement of the ring gear around the spherical centerbearing 24, said ring gear is provided with bevel teeth wherein the lines perpendicular to the pitch cone along the pitch circle pass through the center 24. Taking into account the very low resistance which is opposed to the movement of orientation, it is possible to adopt fine teeth which ensure high precision, as well as devices for automatically taking up side play of the gear-teeth, such devices being of known type and not shown in the figure.

Steps are taken to permit the inspection of the central cup-bearing even while the reactor is at pressure. The sleeve 56 is provided with an internal groove 66 which makes it possible, after removal of the machine 12 and plug 68, to carry out the remote-controlled engagement of a seal plug in accordance with a known arrangement for the purpose of closing off the opening 16. The sleeve 56 is also provided with a lower annular flange 70 which is adapted to cooperate with a ring 72 secured to the pressure vessel 4 in semi-permanent manner by means of keys 74 and a welded joint 76. The seal plug is placed within the opening 16 and the central portion of the radial arm is then lifted, thus placing the annular flange 70 in contact with the ring 72 and ensuring relative leak-tightness. It is then possible to reduce the pressure within the chamber 5 and to carry out manual operations. The motor 63 can be removed and the annular flange 38 can then be withdrawn by unscrewing its locking-nut 78, followed by the cup 34 if necessary.

If the mechanisms employed in the garret are of a simple type and if their control units (hoists, for example) are located outside the garret, the handling device can operate at the temperature of the gas upstream of the reactor: it is then possible to dispense with the cooling unit 44 and to supply the garret with hot gas.

This solution is applicable in particular when the fuelling machine employed is of the type described in the French patent application previously referred to. Accordingly, the operating mechanisms of the machine and of the grappling unit are placed outside the garret, thus permitting the machine to be withdrawn therefrom; and since the motor for driving the radial arm in rotation is also placed outside the garret, it is thus possible to supply said garret with carbon dioxide gas at a relatively high temperature.

It should additionally be noted that those components of the handling device which cannot be withdrawn from the garret can simply be mounted on gas-cushion slides. So far as the other components are concerned, and in particular the machine 12 if this latter is of the type illustrated and therefore capable of withdrawal from the garret, conventional runner-wheels can still be provided.

The numerical data which now follow can be considered as an order of magnitude in the case of a power reactor equipped with an arm which has a radius of 8 meters. The weight of an arm of this type, which is designed to support a fuelling machine weighing approximately 1.5 tons (of which 1 ton is taken up by the shield structure), is of the order of 4 tons, of which 2.5 tons are supported on the central cup-bearing; to this weight should be added the weight of the plug (approximately 0.5 ton).

For operation while the reactor is at pressure, the following approximate values must be envisaged for the different parameters when provision is also made for a cup-bearing and bearing-shoes of suitable design:

|  | Cup-bearing | Bearing-shoe |
| --- | --- | --- |
| Minimum leakage cross-section, cm.$^2$ | 9.4 | 10 |
| Mean overpressure, bar | 1.5 | 0.3 |
| Leakage rate (machine at inner extremity), dm.$^3$/sec | 61 | 73 |

The above figures correspond to the most unfavorable conditions, that is to say as far as the bearing-shoes are concerned, to the case in which the fuelling machine is located at the inner extremity of the radial arm.

When the garret is drained to atmospheric pressure, the effective leakage rates are multiplied by approximately 6 as well as the compression power.

Each movement of the radial arm lasts a maximum period of 20 seconds and therefore demands $0.134 \times 6 \times 20$ dm.$^3 = 16$ m.$^3$ at 2 bars absolute. Provision need merely be made for an accumulator of approximately 6 m.$^3$ at 8 bars together with a compressor having a moderate power rating (50 kw., for example).

It will be readily apparent that this invention is not limited in any sense to the form of embodiment which has been given by way of example and it must be understood that the scope of this patent extends to alternative forms of all or a part of the arrangements herein described and illustrated which come within the definition of equivalent mechanical means.

What I claim is:

1. Handling device for the refuelling facility of a nuclear reactor which is cooled by circulation of heat-transporting gas through vertical channels, said device comprising an arm rotatably mounted about an axis parallel to said channels on a central gas-cushion cup-bearing and on a terminal gas-cushion member slidably mounted on a circular ring, a machine which is movable along said arm, and means for driving said arm in rotation and for driving said machine in translation along said arm, said terminal member being supplied with gas through a pipe carried by the arm from a source which is common with that of said central cup-bearing.

2. Device as described in claim 1 including a pressure vessel for the reactor and a garret inside the pressure vessel, said device being located in said garret, means for drawing off a portion of the heat transporting gas upstream of said vertical channels, the pressure booster increasing the pressure of the withdrawn gas to a pressure which is higher than the pressure prevailing within said garret and pipes for supplying gas from said booster to the central cup-bearing.

3. Device in accordance with claim 2, wherein the garret is supplied with heat-transporting gas at a pressure which is higher than the pressure prevailing within the channels through an auxiliary circuit having a section which is common with the circuit for the supply of gas to the central cup-bearing.

4. Device in accordance with claim 2, wherein the machine is provided with rolling members supported by radially extending inclined flanges on the arm.

5. A refueling facility for a gas cooled nuclear reactor including a handling device comprising an arm rotatable about a vertical axis, a machine movable along said arm, driving means for rotating said arm and driving means for moving said machine along said arm, a plurality of gas cushions supporting said arm and cooperating with stationary parts of the reactor and pipe means partially carried by said arm for supplying gas under pressure from a common source to said cushions.

References Cited

UNITED STATES PATENTS 3,158,002  11/1964  Spillman _____ 176—60
3,179,569  4/1965  Fortescue et al. _____ 176—30
3,205,143  9/1965  Lemesle et al. _____ 176—30

L. DEWAYNE RUTLEDGE, *Primary Examiner.*